United States Patent [19]
Ledermann et al.

[11] Patent Number: 6,055,741
[45] Date of Patent: May 2, 2000

[54] APPARATUS FOR DRAINING WASHED PRODUCTS, PARTICULARLY AGRICULTURAL PRODUCTS

[75] Inventors: Ernst Ledermann, Knonau; Jürg Hofer, Wettswil, both of Switzerland

[73] Assignee: Kundert Ingeniure AG, Schlieren, Switzerland

[21] Appl. No.: 09/201,891

[22] Filed: Nov. 30, 1998

[30] Foreign Application Priority Data

Dec. 1, 1997 [EP] European Pat. Off. .............. 97810934

[51] Int. Cl.⁷ .................................................... F26B 11/02
[52] U.S. Cl. ................................ 34/129; 34/171; 34/178; 34/190; 34/236
[58] Field of Search .............................. 34/127, 128, 129, 34/164, 165, 171, 178, 189, 190, 236; 198/347.1, 468.7, 468.1; 414/414, 416; 366/341

[56] References Cited

U.S. PATENT DOCUMENTS

| 1,014,748 | 1/1912 | Berry ........................................ 34/129 |
| 1,327,486 | 1/1920 | McIntyre . | |
| 1,925,362 | 9/1933 | Anstiss ...................................... 34/129 |
| 3,686,773 | 8/1972 | Schreiner .................................. 34/171 |
| 3,711,959 | 1/1973 | Van Der Lely ....................... 34/236 X |
| 3,793,745 | 2/1974 | Myers . | |
| 3,927,715 | 12/1975 | Castanoli .............................. 34/171 X |
| 4,426,256 | 1/1984 | Johnsen ..................................... 34/171 |
| 4,949,472 | 8/1990 | Arnone .................................. 34/236 X |
| 5,483,752 | 1/1996 | Kreft et al. ........................... 34/178 X |
| 5,632,097 | 5/1997 | Snitchler et al. ..................... 34/171 X |

FOREIGN PATENT DOCUMENTS

| 663728 | 4/1929 | France . |
| 2401393 | 3/1979 | France . |
| 2562220 | 10/1985 | France . |
| 291514 | 10/1913 | Germany . |
| 707987 | 5/1941 | Germany . |
| 1072182 | 6/1967 | United Kingdom . |

*Primary Examiner*—Stephen Gravini
*Attorney, Agent, or Firm*—Browdy and Neimark

[57] ABSTRACT

The apparatus has a plurality of conveying elements (20) that are connected in series, and have two parallel toothed belts and steel carrier sheets connected thereto. The belts are respectively guided over deflecting wheels (15), where the conveying elements (20) are deflected by about 180°. The products to be drained are continuously and sequentially placed onto the conveying elements (20), with the water that is still clinging to the products being spun off at the deflecting wheels (15). The apparatus can be used to achieve gentle drainage in a continuous process.

20 Claims, 7 Drawing Sheets

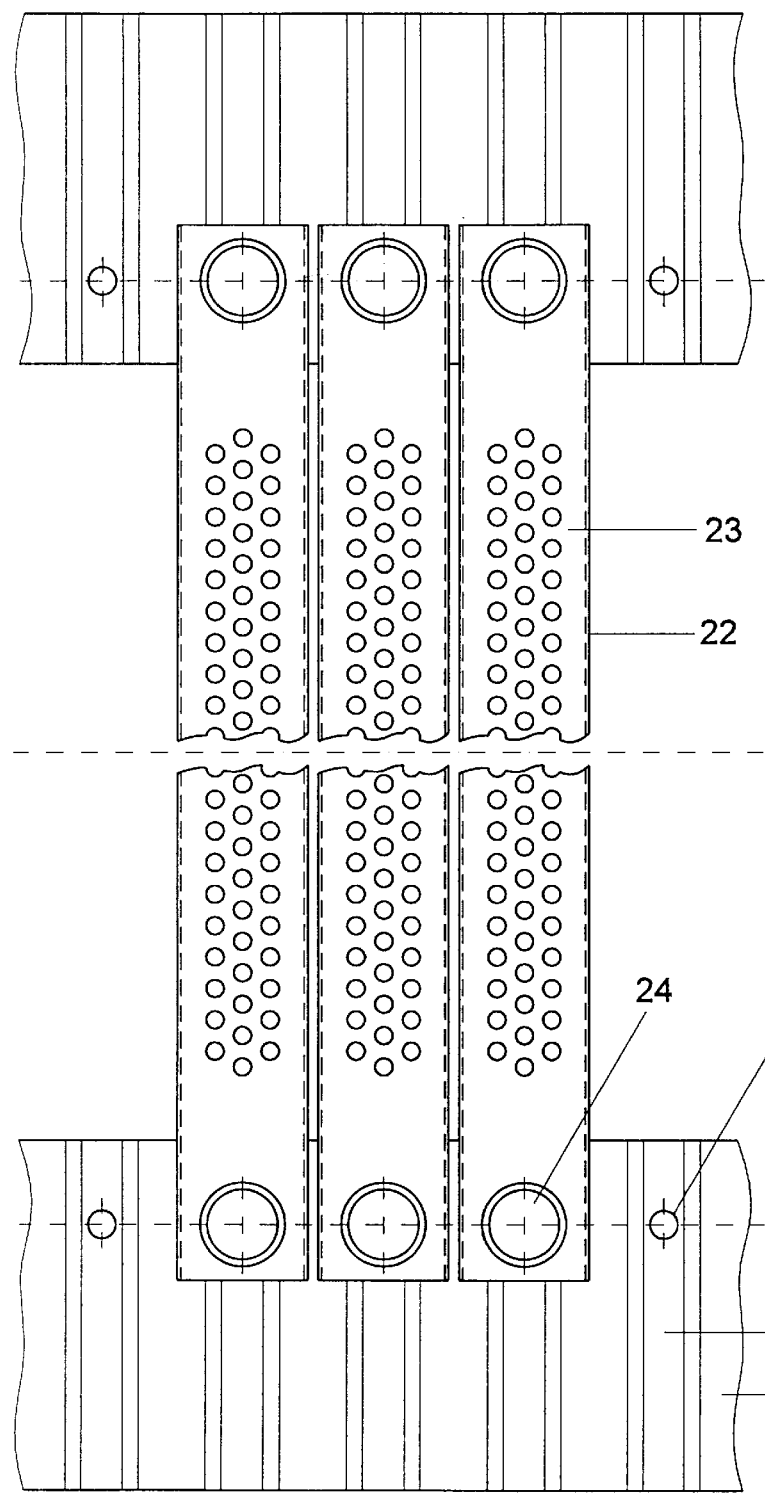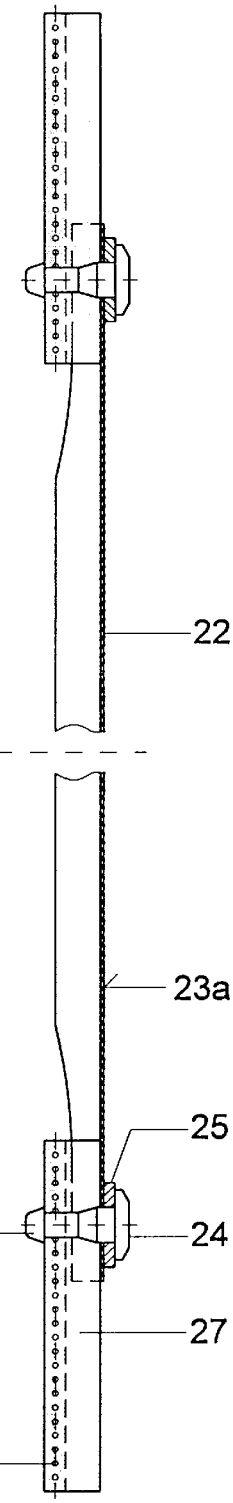

APPARATUS FOR DRAINING WASHED PRODUCTS, PARTICULARLY AGRICULTURAL PRODUCTS

It is known to drain washed products, for example lettuce, in centrifuges. The majority of the washing water still clinging to the lettuce is spun off. This prior process cannot be effected continuously. For this to occur, the present centrifuges would have to operate at such high rpms (radial accelerations) to attain the desired amount of drainage that fragile products, such as lettuce in particular, could be damaged, and would be less visually appealing and more perishable.

It is an object of the invention to provide an apparatus with and by which washed products can be drained gently in a continuous manner. This object is accomplished by the combination of features listed in the claims.

Some embodiments of the invention, which are illustrated in the drawings, are described below.

FIGS. 7–10 are representations of a second embodiment, corresponding to FIGS. 1 through 4.

Figure 1:
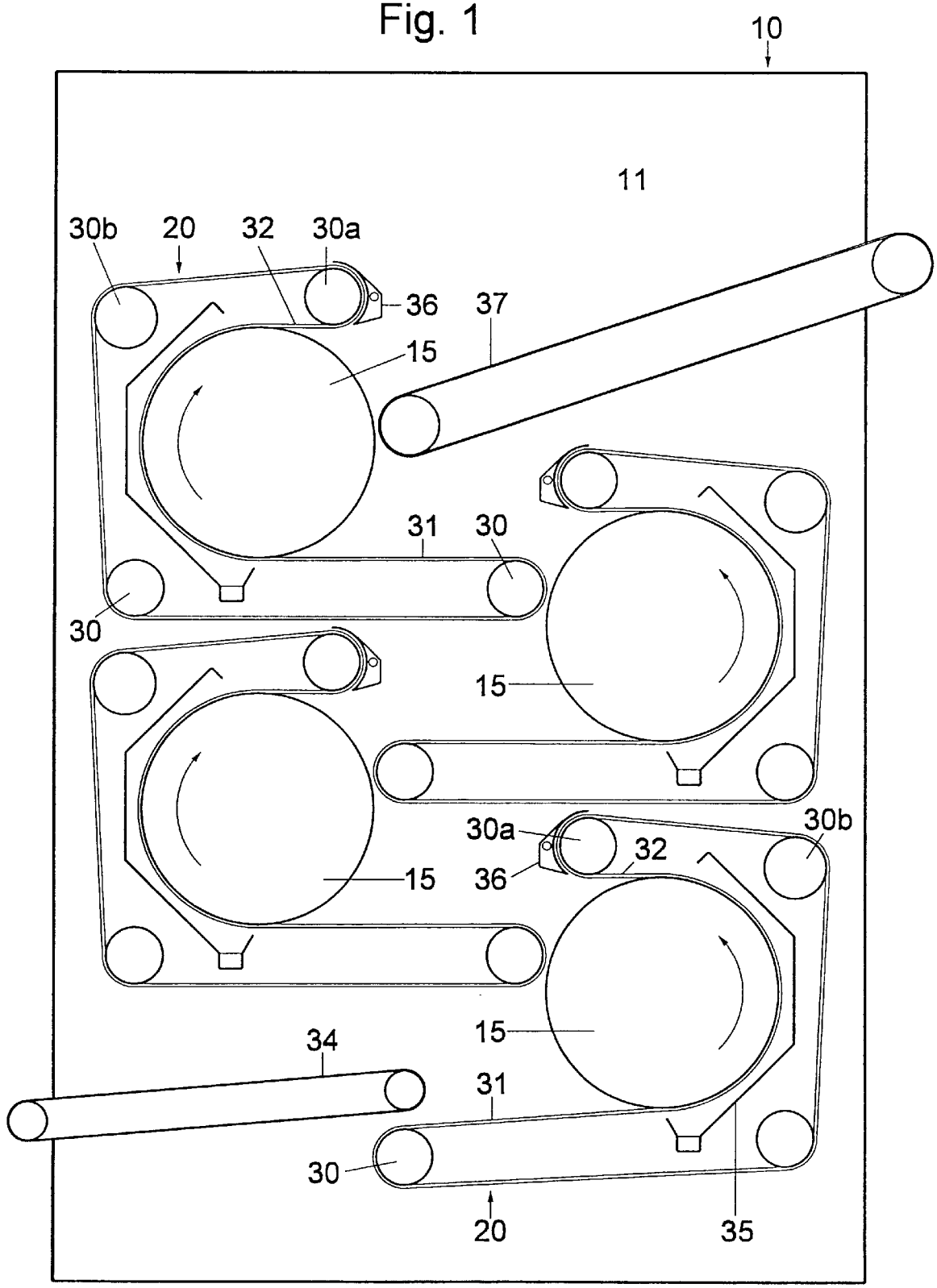
FIG. 1 is a schematic side view of an embodiment according to the present invention.
Figure 2:
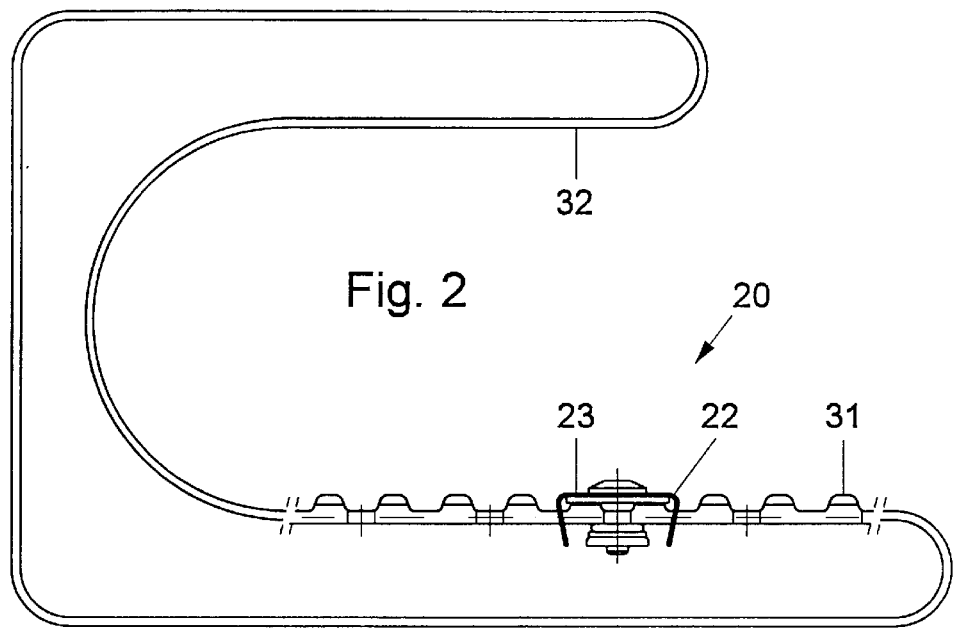
FIG. 2 is a side view of a conveying element thereof.
Figure 3:
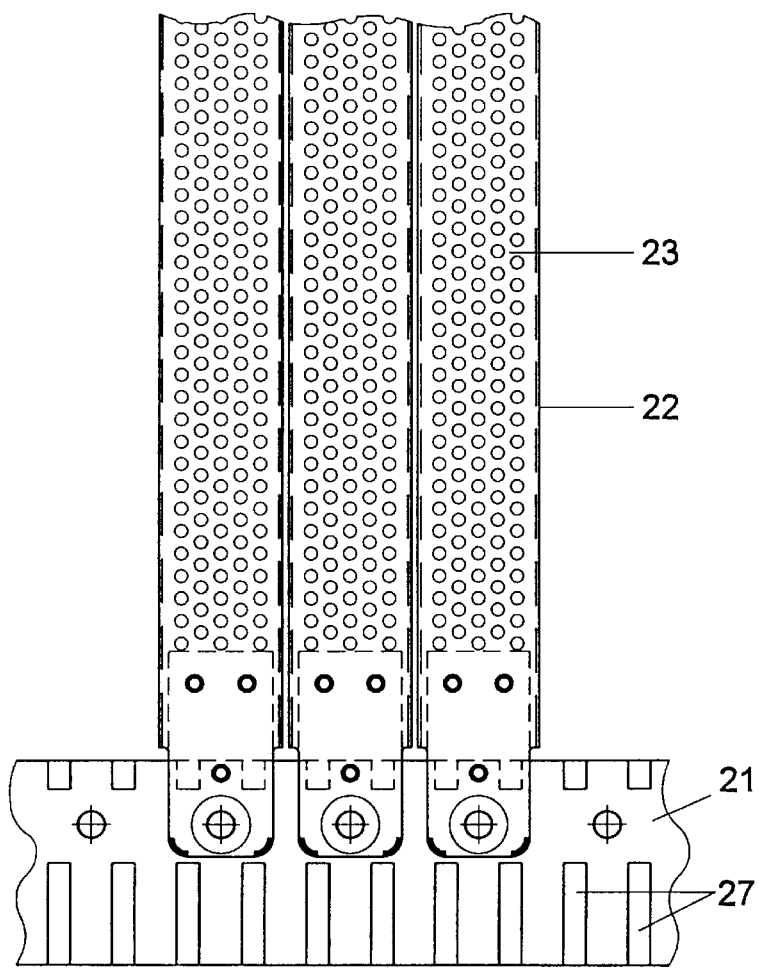
FIGS. 3 and 4 are respectively a plan view and a cross-section through a conveying element thereof.
Figure 4:
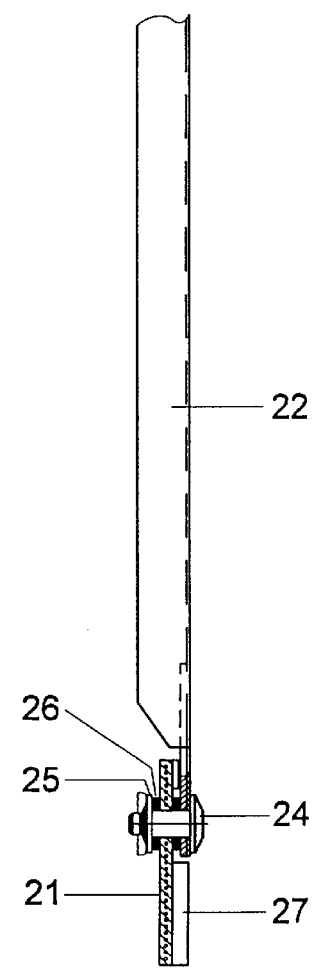
Figure 5:
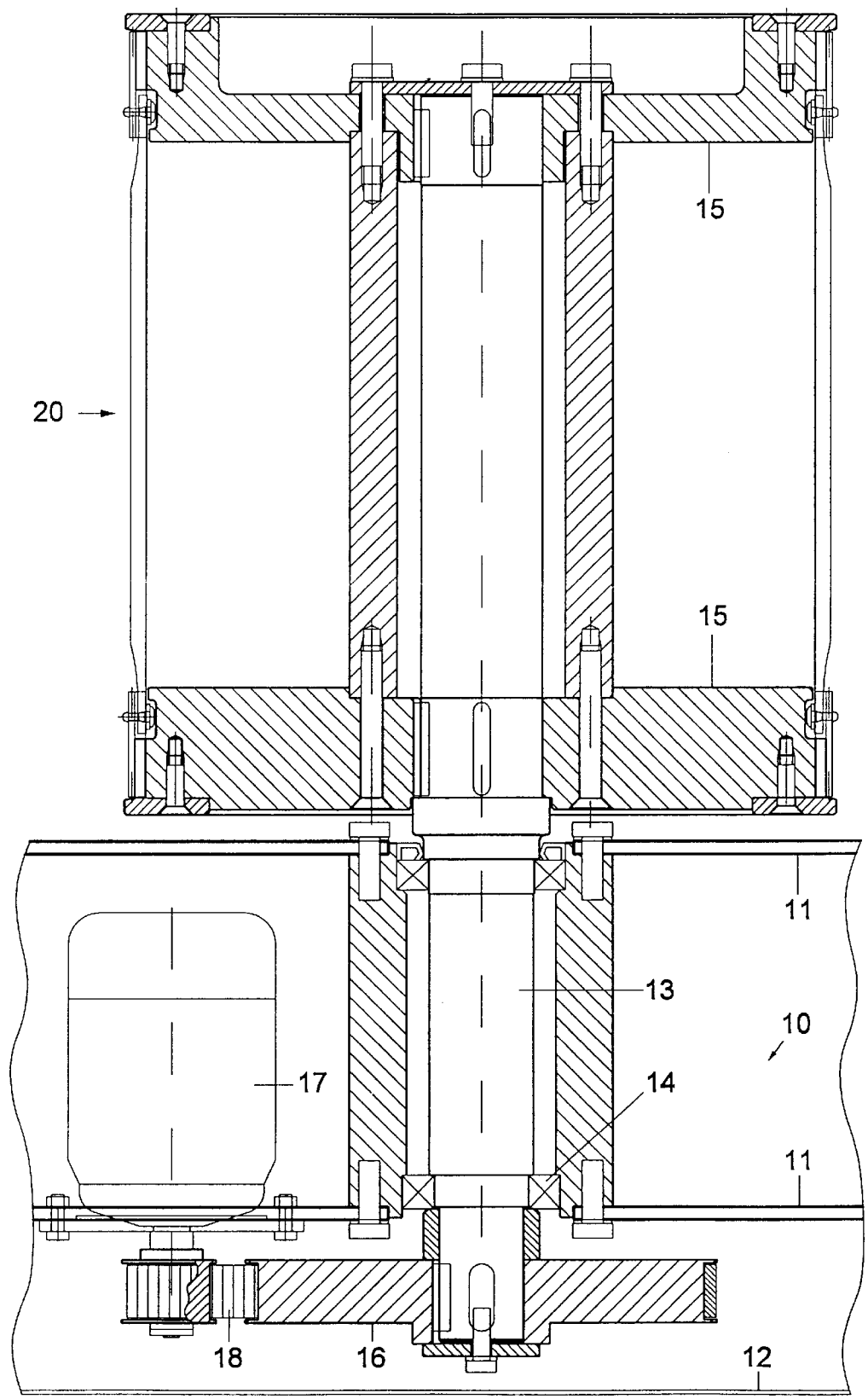
FIG. 5 is a cross-section through a deflecting wheel thereof.

The illustrated embodiments include a housing 10, which comprises two parallel, vertical carrier plates 11 and a rear wall 12 (FIG. 5). Four drive shafts 13 are rotatably seated on roller bearings 14 in the housing 10 (FIG. 5). Two deflecting wheels 15 are secured to each shaft 13 with axial spacing. On the rear side of the housing 10, a toothed-belt wheel 16 is secured to each shaft 13. A common drive motor 17 drives the four wheels 16 by way of a toothed belt 18. The wheels 16 of the four shafts 13 can have different numbers of teeth in order to graduate the rpm of the wheels 15. For example, the lowest wheel 16 at the inlet end can have an approximately 20% larger diameter than the two following wheels 16, so that the latter will rotate at a faster rate.

Extending around about half of the circumference of each pair of wheels 15 is a conveying element 20 comprising two parallel toothed belts 21 and stainless-steel sheets 22, which are curved, e.g. bent, in a C-shape and are secured to and extend transversely between the belts 21. The web 23 of each sheet 22 is desirably planar and perforated. The sheets 22 border one another with slight spacing therebetween. The webs 23 are secured to opposite sides of the belts 21 by a bolt 24 and washers 25, with interposed rubber rings 26 or by other suitable connecting means.

The belts 21 only have teeth 27 on a portion of their width, specifically on the side of the webs 23. They are preferably reinforced with steel cables or wires, or steel cores. Thus, they are restrained from stretching and consequently stretch very little or not at all, and have a long service life. The conveying elements 20 are respectively guided over four pairs of deflecting rollers 30 such that (1) a virtually-horizontal, lower, longer run-in run 31 and (2) a short, virtually-horizontal run-out run 32 are formed. The rollers 30 are rotatably over-mounted on horizontal pins 33 secured to the housing.

The run-in run 31 of the lowest conveying element 20 is loaded by a conveyor belt 34 with washed agricultural products, such as vegetables or lettuce, or sliced, raw potatoes for producing French fries, or other product, e.g. produce. As the conveying element 20 passes over the wheels 15, the water is partially spun off from the products and collected in a collecting basin 35 that encompasses the rear side of the conveying element 20 at the wheels 15; the water is subsequently carried off. The basin 35 is drained laterally to the bottom.

A collecting body 36 is disposed at the deflecting rollers 30a at the end of the run 32 downstream of the discharge location. Here the water still clinging to the inside of the sheets 22 is spun off with significantly larger centrifugal forces due to the small diameter of the rollers 30a. Such water is then captured by the collecting body 36 and re-deposited onto the conveying element 20 by the air current generated by the webs 23 at the upper part of the collecting body 36. At the deflecting roller 30b, this water is eventually spun off onto the machine casing.

The collecting body 36 is embodied as a hollow toughlike body, and is equipped with a separating nozzle that is aimed at the deflecting roller 30a. Pieces of products that stick between the collecting body 36 and the deflecting roller 30a are transported away by means of compressed air that is supplied at adjustable intervals.

From the run-out run 32, the products are spun onto the run-in run 31 of the next consecutive conveying element 20, where the draining process is repeated analogously. From the run-out run 32 of the uppermost conveying element 20, the drained products are spun onto a further conveyor belt 37. The discharge conveyor 37 conveys the products to a further processing station, e.g. a continuous drier, or directly to a packing machine or, in the production of French fries, to a deep-fat fryer.

Because the products are drained successively at a plurality of deflecting wheels 15, and rearranged between consecutive wheels 15, they are efficiently drained on both sides, even with relatively-low radial accelerations of about 20 to 25 g. In contrast, conventional centrifuges operate with about 60 g radial acceleration. The significantly lower accelerations of the apparatus of the present invention ensure that the products are handled gently. Consequently, fragile products such as heads of lettuce can be kept longer.

A drainage degree of 4 to 10% residual water is attained with the described apparatus. In a downstream continuous drier, the degree of dryness increases to about 2% residual water. This can also make the products keep longer. Draining takes place in a continuous manner. Consequently, the current practice of batch-wise loading and unloading of centrifuges is avoided. This also considerably reduces the labor required from operating personnel. The overmounting of the deflecting wheels 15 and deflecting rollers 30 greatly facilitates maintenance, cleaning and operating.

Instead of the belts 21, other endless, flexible tension elements can be used, such as chains or steel cables. If chains are used, the sheets 22 can be positioned, for example, on both sides on two adjacent hinge bolts of the chain, or secured to a respective chain element. In this case, the wheels 15 are chain wheels. If steel cables are used, the sheets 22 are provided on both sides with laterally-protruding pins, for example, which have slots that can be placed laterally onto the cables and subsequently fixed. The wheels 15 have corresponding recesses for the pins. Consequently, precise synchronous running of the two parallel cables is attained.

Figure 6:
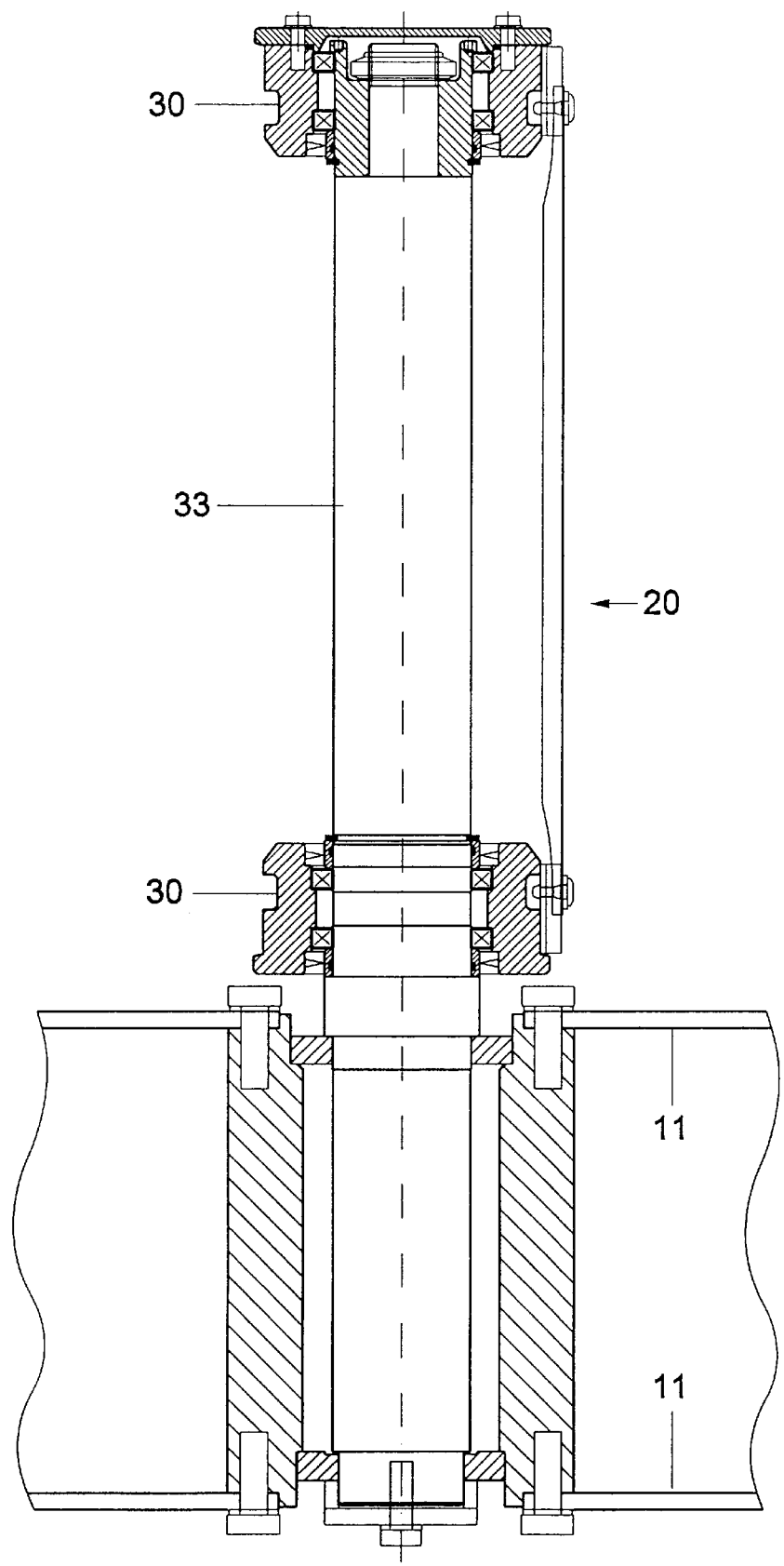
FIG. 6 is a cross-section through a deflecting roller thereof.
Figure 7:
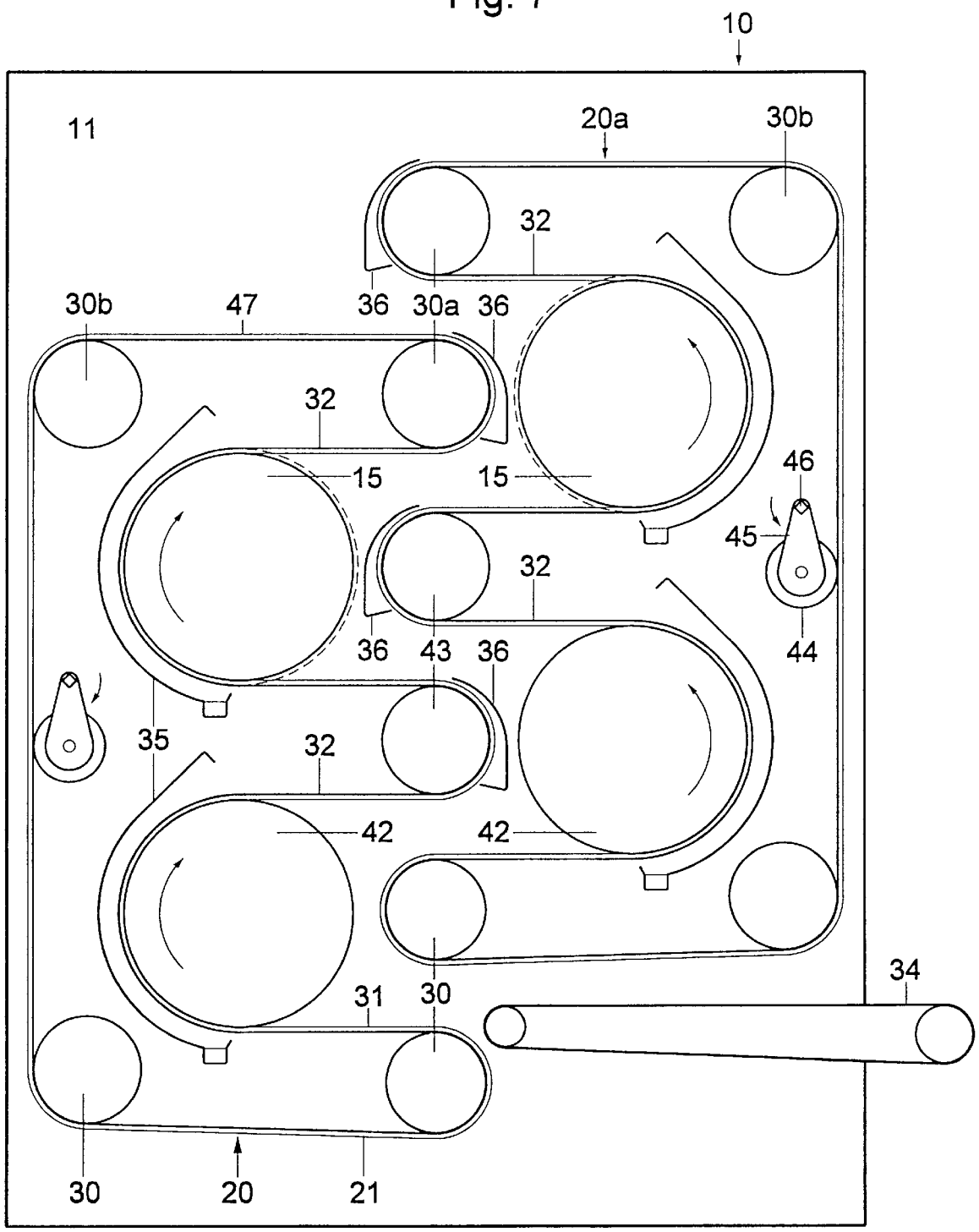
Figure 8:
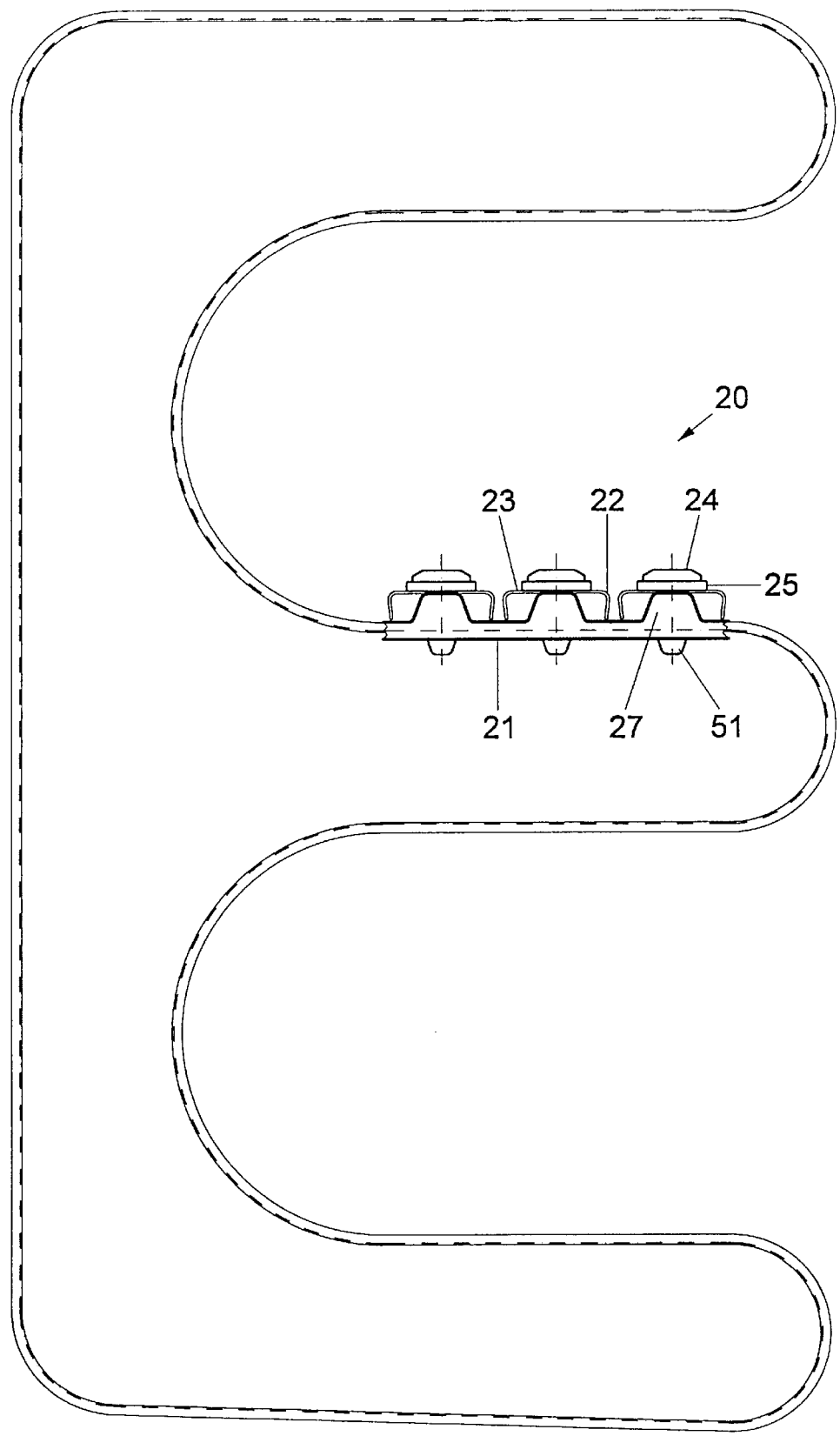

In the embodiment according to FIGS. 7 through 10, analogous parts are provided with the same reference numerals, so no detailed description of these parts is necessary. This second illustrated embodiment has only two conveying elements 20, 20a, which are, however, guided over two deflecting wheels 15, 42. Only one of these deflecting-wheel pairs 15 is driven. The two coaxial individual wheels 42 of the other wheel pair are seated to rotate freely on pins 33, like the rollers 30 in FIG. 6. The advantage of this arrangement is that, with a slightly-varying length of the two parallel toothed belts 21, which occurs for tolerance reasons, the belts do not twist with respect to one another. This minimizes the wear of the toothed belts 21.

One deflecting-roller pair 43 of each conveying element 20, 20a is adjacent to a deflecting-wheel pair 15, 42 of the other conveying element 20a, 20. The conveying elements 20, 20a are therefore loaded twice consecutively by the respectively other conveying element 20a, 20. The deflecting rollers 30, 43 have a larger diameter than in the embodiment according to FIGS. 1 through 4, resulting in a larger bending radius of the toothed belts 21 at the wheels 30, 43. The belts 21 are therefore less stressed, which positively impacts their service life. In this embodiment, the collecting bodies 36 are drained laterally.

Each toothed belt 21 is tensed by a tension roller 44, which is rotatably seated on an arm 45. The arm 45 can pivot about a shaft 46, and is resiliently pressed against the relevant belt 21. From the last deflecting roller 15, the drained product is spun onto the run 47 of the other conveying element, which assumes the function of the conveyor belt 37 of FIG. 1 until it reaches the next deflecting roller 30b, that is, this run carries the product away.

The sheets 22 are secured by their webs 23 directly to the teeth 27 of the toothed belts 21, specifically with bolts 24 that penetrate bores 50 of the toothed belt 21 and have a retaining shoulder 51 at their free end. The washer 25 is made of plastic. The toothed belts 21 are thicker than those according to FIGS. 2 through 4. The teeth pass through, which is permitted by the other securing of the sheets 22. This simplifies the production of the belts.

The primary advantage of the embodiment according to FIGS. 7 through 10 over the embodiment according to FIGS. 1 through 4 is that it requires fewer individual parts, and is therefore less expensive to produce. Because a run that is otherwise not being used assumes the task of transporting the products directly from one of the conveying elements 20 to a conveyor of a subsequent apparatus (packing machine or drier), a separate conveyor belt for this function can be omitted. The mere four toothed belts, rather than eight, are more cost-effective, despite their slightly greater length. The drive is simplified, because only two wheel pairs 15 are still driven.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . .", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

What is claimed is:

1. An apparatus for draining washed products, particularly agricultural products, comprising a plurality of conveying elements (20) that are connected in series and include carriers (22) with holding surfaces (23a) for the products, wherein each conveying element (20) is guided over at least one coaxial deflecting-wheel pair (15, 42) and deflecting rollers (30, 43) such that the conveying element forms an essentially U-shaped loop (31, 32) around each deflecting-wheel pair (15, 42), with the holding surface (23a) facing a shaft (13) of said deflecting-wheel pair (15, 42), and with the products being conveyed to the next downstream conveying element (20), or to an element (37, 47) for transporting the products away.

2. The apparatus according to claim 1, wherein the conveying elements (20) include two parallel, endless, flexible tension elements (21), to which the carriers (22) are secured, and with the deflecting rollers (30, 43) being disposed coaxially in pairs.

3. The apparatus according to claim 1, wherein the carriers are perforated steel sheets (22) that are secured to the tension elements (21).

4. The apparatus according to claim 3, wherein the sheets (22) are C-shaped.

5. The apparatus according to claim 4, wherein the tension elements (21) are toothed belts.

6. The apparatus according to claim 5, wherein only one deflecting-wheel pair (15) per conveying element (20) is motor-driven.

7. The apparatus according to claim 6, wherein all of the conveying elements (20) are overmounted, so they are easily accessible from one side.

8. The apparatus according to claim 7, including a first conveying element (20) and a second conveying element (20a), with said first and second conveying elements being guided over at least two respective deflecting-wheel pairs (15, 42) and a plurality of deflecting rollers (30, 43), with one of these deflecting rollers (43) of the first conveying element (20) being adjacent to a deflecting-wheel pair (42) of the second conveying element (20a), forming a run-out run (32) of the first deflecting-wheel pair (42) in the conveying direction, and a run-in run (31) of a third deflecting-wheel pair (42) in the conveying direction.

9. The apparatus according to claim 8, wherein the conveying elements (20) include two parallel, flexible tension elements (21), with the deflecting rollers (30, 43) being disposed coaxially in pairs, and with only one of the coaxial deflecting-wheel pairs (15) or deflecting-roller pairs (30, 43) being connected to one another so as to be fixed against relative rotation, as well as to a drive (17), and all of the other deflecting rollers (30, 43) and deflecting wheels (42) being seated to be freely rotatable.

10. The apparatus according to claim 2, wherein the tension elements (21) are toothed belts.

11. The apparatus according to claim 2, wherein only one deflecting-wheel pair (15) per conveying element (20) is motor-driven.

12. The apparatus according to claim 2, wherein all of the conveying elements (20) are overmounted, so they are easily accessible from one side.

13. The apparatus according to claim 1, including a first conveying element (20) and a second conveying element (20a), with said first and second conveying elements being guided over at least two respective deflecting-wheel pairs (15, 42) and a plurality of deflecting rollers (30, 43), with one of these deflecting rollers (43) of the first conveying element (20) being adjacent to a deflecting-wheel pair (42) of the second conveying element (20a), forming a run-out run (32) of the first deflecting-wheel pair (42) in the conveying direction, and a run-in run (31) of a third deflecting-wheel pair (42) in the conveying direction.

14. The apparatus according to claim 13, wherein the conveying elements (20) include two parallel, flexible tension elements (21), with the deflecting rollers (30, 43) being disposed coaxially in pairs, and with only one of the coaxial deflecting-wheel pairs (15) or deflecting-roller pairs (30, 43) being connected to one another so as to be fixed against relative rotation, as well as to a drive (17), and all of the other deflecting rollers (30, 43) and deflecting wheels (42) being seated to be freely rotatable.

15. The apparatus according to claim 2, including a first conveying element (20) and a second conveying element (20a), with said first and second conveying elements being guided over at least two respective deflecting-wheel pairs (15, 42) and a plurality of deflecting rollers (30, 43), with one of these deflecting rollers (43) of the first conveying element (20) being adjacent to a deflecting-wheel pair (42) of the second conveying element (20a), forming a run-out run (32) of the first deflecting-wheel pair (42) in the conveying direction, and a run-in run (31) of a third deflecting-wheel pair (42) in the conveying direction.

16. The apparatus according to claim 15, wherein the conveying elements (20) include two parallel, flexible tension elements (21), with the deflecting rollers (30, 43) being disposed coaxially in pairs, and with only one of the coaxial deflecting-wheel pairs (15) or deflecting-roller pairs (30, 43) being connected to one another so as to be fixed against relative rotation, as well as to a drive (17), and all of the other deflecting rollers (30, 43) and deflecting wheels (42) being seated to be freely rotatable.

17. The apparatus according to claim 3, including a first conveying element (20) and a second conveying element (20a), with said first and second conveying elements being guided over at least two respective deflecting-wheel pairs (15, 42) and a plurality of deflecting rollers (30, 43), with one of these deflecting rollers (43) of the first conveying element (20) being adjacent to a deflecting-wheel pair (42) of the second conveying element (20a), forming a run-out run (32) of the first deflecting-wheel pair (42) in the conveying direction, and a run-in run (31) of a third deflecting-wheel pair (42) in the conveying direction.

18. The apparatus according to claim 17, wherein the conveying elements (20) include two parallel, flexible tension elements (21), with the deflecting rollers (30, 43) being disposed coaxially in pairs, and with only one of the coaxial deflecting-wheel pairs (15) or deflecting-roller pairs (30, 43) being connected to one another so as to be fixed against relative rotation, as well as to a drive (17), and all of the other deflecting rollers (30, 43) and deflecting wheels (42) being seated to be freely rotatable.

19. The apparatus according to claim 4, including a first conveying element (20) and a second conveying element (20a), with said first and second conveying elements being guided over at least two respective deflecting-wheel pairs (15, 42) and a plurality of deflecting rollers (30, 43), with one of these deflecting rollers (43) of the first conveying element (20) being adjacent to a deflecting-wheel pair (42) of the second conveying element (20a), forming a run-out run (32) of the first deflecting-wheel pair (42) in the conveying direction, and a run-in run (31) of a third deflecting-wheel pair (42) in the conveying direction.

20. The apparatus according to claim 19, wherein the conveying elements (20) include two parallel, flexible tension elements (21), with the deflecting rollers (30, 43) being disposed coaxially in pairs, and with only one of the coaxial deflecting-wheel pairs (15) or deflecting-roller pairs (30, 43) being connected to one another so as to be fixed against relative rotation, as well as to a drive (17), and all of the other deflecting rollers (30, 43) and deflecting wheels (42) being seated to be freely rotatable.

* * * * *